(12) United States Patent
Liu

(10) Patent No.: US 8,871,106 B2
(45) Date of Patent: Oct. 28, 2014

(54) MASKING METHOD FOR LOCALLY TREATING SURFACE

(71) Applicant: Apone Technology Ltd., Taoyuan County (TW)

(72) Inventor: Wei-Lin Liu, Taoyuan County (TW)

(73) Assignee: Apone Technology Ltd., Zhongli (TW)

( * ) Notice: Subject to any disclaimer, the term of this patent is extended or adjusted under 35 U.S.C. 154(b) by 0 days.

(21) Appl. No.: 13/658,216

(22) Filed: Oct. 23, 2012

(65) Prior Publication Data

US 2014/0014619 A1  Jan. 16, 2014

(30) Foreign Application Priority Data

Jul. 13, 2012 (TW) .............................. 101125313 A

(51) Int. Cl.
*B44C 1/22* (2006.01)
(52) U.S. Cl.
USPC .................... 216/41; 216/49; 216/51; 216/54
(58) Field of Classification Search
None
See application file for complete search history.

(56) References Cited

U.S. PATENT DOCUMENTS

| 5,844,650 A * | 12/1998 | Saito et al. ..................... 349/126 |
| 2006/0240335 A1* | 10/2006 | Mitsui ............................... 430/5 |
| 2011/0042874 A1* | 2/2011 | Aoki et al. ....................... 269/20 |

FOREIGN PATENT DOCUMENTS

JP            56055042        *  5/1981  ............. H01L 21/30

* cited by examiner

*Primary Examiner* — Lan Vinh
*Assistant Examiner* — Jiong-Ping Lu
(74) *Attorney, Agent, or Firm* — Meagher Emanuel Laks Goldberg & Liao, LLP

(57) ABSTRACT

This present invention provides a masking method for locally treating surface of a workpiece by masking the workpiece. The workpiece has a targeting treatment area and a non-targeting treatment area. The masking method includes: covering a fixture on the non-targeting treatment area of the workpiece to expose the targeting treatment area of the workpiece; by using an adsorbing force existing between the fixture and the workpiece, getting the fixture to closely contact with the non-targeting treatment area of the workpiece and to make an end edge of the fixture correspond to the edge of the targeting treatment area of the workpiece, wherein the adsorbing force is a vacuum adsorbing force or a static electric adsorbing force. Thereby the surface treatment only effects in an area within the range of the targeting treatment area of the workpiece so as to reduce the treatment defect.

6 Claims, 3 Drawing Sheets

MASKING METHOD FOR LOCALLY TREATING SURFACE

FIELD OF THE INVENTION

The present invention relates to a masking method, and more particularly to a masking method for locally treating surface.

BACKGROUND OF THE INVENTION

Machining objects, hereinafter referred as workpieces, are usually processed through processes such as electroplating treatment, exposure treatment, and coating treatment before as finished objects. If certain area of the workpiece is not desired to perform such surface treatment, it usually blocks or masks the certain area by a fixture element, so that it achieves the processes in the desire area but not in the certain area that is not desired to process.

However, when masking the certain area not being processed in desired by using the fixture element, it strictly requires the relationship of close connection between the fixture element and the workpiece, such as the accurate correspondence between the opening of the fixture element and the area being processed, in order to exactly get the processing area not being blocked and exactly block the area not being processed.

SUMMARY OF THE INVENTION

However, in the prior art, it usually has a bad correspondence between the opening of the fixture element and the area being processed, so that it causes the electroplating material, the coating material, and the light of the exposure influences to apply improperly because of extending over treatment area in desire.

Accordingly, an aspect of the present invention is to provide a masking method for locally treating surface that ensures the surface treatment is only performed within the expected surface treatment area to make the manufacture deficiency decreases so as to forming an expected workpiece surface.

The masking method for locally treating surface of a workpiece by masking the workpiece, wherein the workpiece has a targeting treatment area and a non-targeting treatment area, the masking method comprising steps of: (a) covering a fixture on the non-targeting treatment area of the workpiece to expose the targeting treatment area of the workpiece; (b) getting the fixture to closely contact with the non-targeting treatment area of the workpiece by using an adsorbing force existing between the fixture and the workpiece to make an end edge of the fixture correspond to the edge of the targeting treatment area of the workpiece, wherein the adsorbing force is a vacuum adsorbing force or a static electric adsorbing force.

According to an embodiment of the present invention, in the step (a), the fixture is made of a plastic material.

According to an embodiment of the present invention, it further comprises, before step (a), a step of performing a static-electricity treatment on the fixture when the adsorbing force is the static electric adsorbing force.

According to an embodiment of the present invention, in the step (a), the workpiece is covered within the fixture by inserting the workpiece into the fixture, and a gap space is formed between the fixture and the workpiece.

According to an embodiment of the present invention, in the step (a), the vacuum adsorbing force is provided by exhausting the air within the gap space.

According to an embodiment of the present invention, the fixture includes a suction hole communicating with the gap space.

According to an embodiment of the present invention, it further comprises, after step (b), a step of performing a surface treatment on the targeting treatment area of the workpiece.

According to an embodiment of the present invention, the surface treatment is an exposure treatment, an etching treatment, an electroplating treatment, or a laser carving treatment.

By means of technical means of the present invention, the absorbing force can make the fixture and the workpiece contact with each other closely. It makes sure that the end edge of the fixture accurately corresponds to the edge of the targeting treatment area. So the surface treatment only performed within the range of the targeting treatment area and thus prevent from the manufacture deficiency.

In particular, the absorbing force in the present invention is a vacuum adsorbing force or a static electric adsorbing force. So it is easily to provide the absorbing force and to remove the absorbing force without breaking the fixture or the surface of the workpiece. The masking method in the present invention is not only good at masking but also easily to be performed, thus it is very suitable for locally treating surface.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The present invention is to provide a masking method to make a fixture and a workpiece closely contact with each other by using a vacuum adsorbing force or a static electric adsorbing force existing between the fixture and the workpiece for further locally treating surface of the workpiece. The embodiment of the masking method about the vacuum adsorbing force or that about the static electric adsorbing force are respectively described as follows.

The First Embodiment

Figure 1:
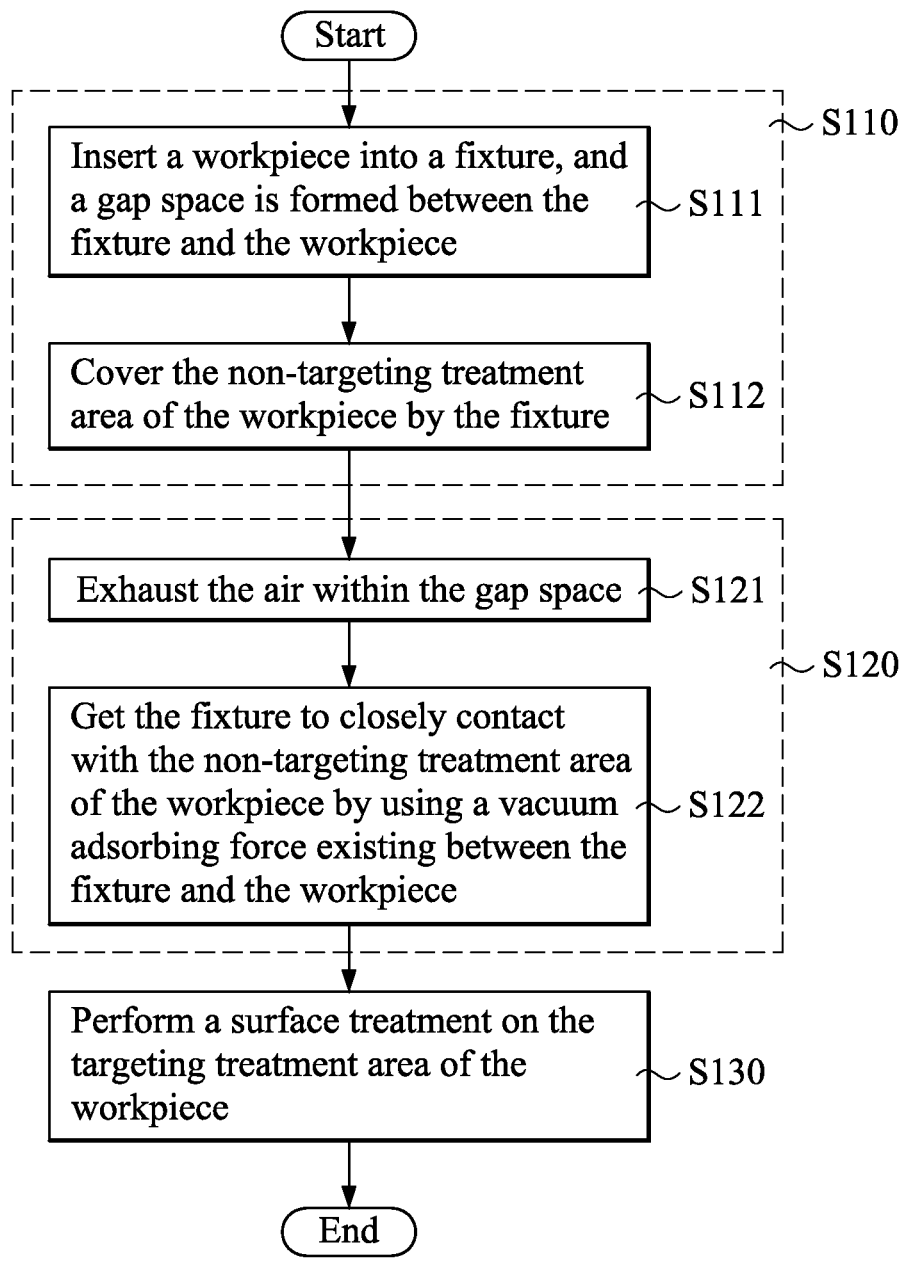
FIG. 1 is a flowchart illustrating the masking method for locally treating surface of the first embodiment according to the present invention.

Refer to FIG. 1. FIG. 1 is a flowchart illustrating the masking method for locally treating surface of the first embodiment according to the present invention. In this embodiment, the vacuum adsorbing force is taken as an example. The masking method for locally treating surface comprises: Covering a fixture on the non-targeting treatment area of the workpiece to expose the targeting treatment area of the workpiece (step S110); Getting the fixture to closely contact with the non-targeting treatment area of the workpiece by using an adsorbing force existing between the fixture and the workpiece to make an end edge of the fixture correspond to the edge of the targeting treatment area of the workpiece (step S120).

In detail, in the step 110, the workpiece is covered within the fixture by inserting the workpiece into the fixture, and a gap space is formed between the fixture and the workpiece (step S111). And the non-targeting treatment is covered by the fixture (step 112). In the step 120, the air within the gap space is exhausted (step S121), and the fixture closely contact with the non-targeting treatment area of the workpiece by using the vacuum adsorbing force existing between the fixture and the workpiece (step S122).

Figure 2A:
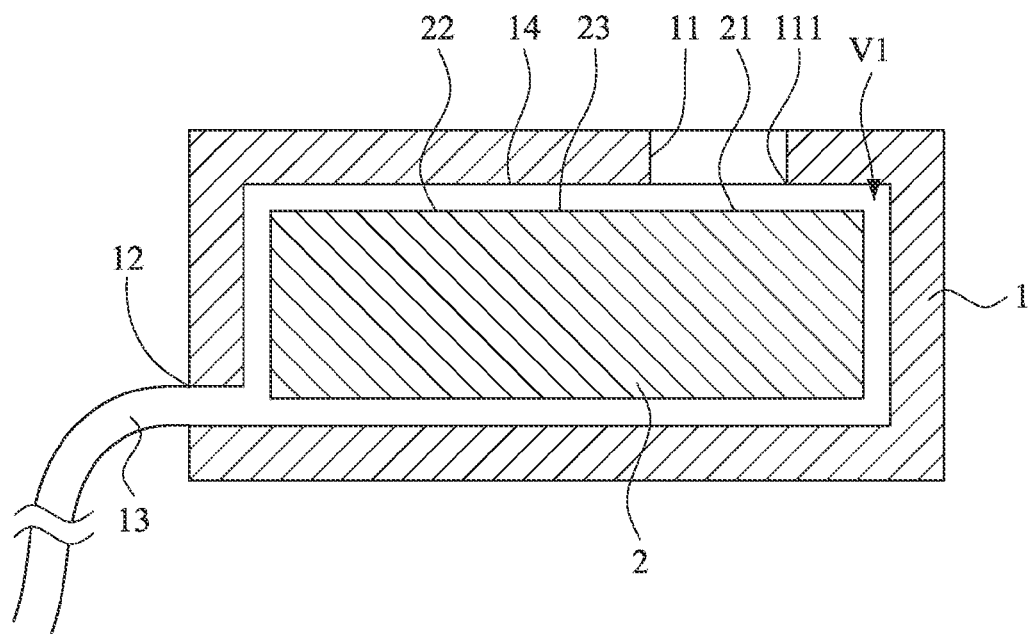
FIG. 2A is a cross-sectional view drawing illustrating the fixture and the workpiece of the first embodiment according to the present invention when the adsorbing force is not applied.
Figure 2B:
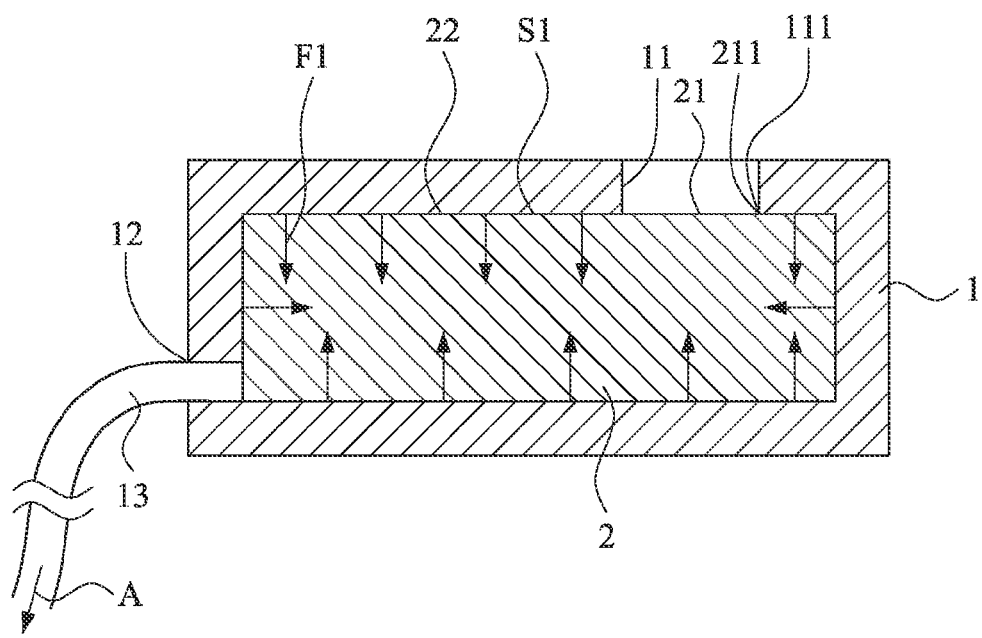
FIG. 2B is a cross-sectional view drawing illustrating the fixture and the workpiece of the first embodiment according to the present invention when the adsorbing force is applied.

Also Refer to FIG. 2A and FIG. 2B, the fixture 1 has an end edge 111 which is the edge of a part that has no masking efficacy. For example, in this embodiment, fixture 1 has an opening 11, and the edge of opening 11 is the end edge 111. However, the present invention is not limited to that. The end edge 111 can also be the edge of the punch hole of the fixture. Alternatively, the end edge 111 can also be the gap between two panels of the fixture.

First, insert the workpiece 2 into the fixture 1 (step S111). The size of the workpiece 2 is smaller than the inner size of the fixture 1 so that the workpiece 2 can be inserted into the fixture 1 and a gap space V1 between the fixture 1 and the workpiece 2 is formed.

Next, cover a contact side 23 of the non-targeting treatment area 22 of the workpiece 2 by a covering side 14 of the fixture 1 (step S 112). Both the shape of the opening 11 and the area of the opening 11 are the same of those of a targeting treatment area 21 of the workpiece 2. When the opening 11 are corresponding to the targeting treatment area 21 and the targeting treatment area 21 is exposed, the contact side 23 of the non-targeting treatment 22 is covered by the covering side 14 of the fixture 1 at a contact surface S1.

And then, exhaust the air within the gap space V1 (step S121). In this embodiment, the fixture 1 has a suction hole 12 communicating with the gap space V1. And the suction hole 12 communicates with a suction pipe 13 communicating with an air extractor (not shown). When the air extractor is operated, the air within the gap space V1 is exhausted via the suction pipe 13. Thus, the gap space V1 between the fixture 1 and the workpiece 2 becomes vacuum gradually. And in this embodiment, the fixture 1 is made of a plastic material, such as the PP, PVC, or the like. The plastic material has the characteristic that it is easy to be deformed due to be forced. Thereby, a vacuum adsorbing force F1 at the contact surface S1 generated by exhausting the air within the gap space V1 makes the fixture 1 being deformed and closely contact to the workpiece 2 so that the contact side 23 of the non-targeting treatment area 22 of the workpiece 2 and the covering side 14 of the fixture 1 closely contact with each other (step S122), shown as FIG. 2B.

Next, perform a surface treatment on the targeting treatment area 21 of the workpiece 2 (step S130). In this embodiment, the surface treatment is an exposure treatment. The surface treatment also can be an etching treatment, an electroplating treatment, a laser carving treatment, or the like. Because when non-target treatment area 22 of the workpiece 2 and the fixture 1 closely contact with each other, the end edge 111 of the opening 11 of the fixture 1 corresponds to the edge 211 of the targeting treatment area 21 of the workpiece 2. So the surface treatment are not performed on the non-targeting treatment 22 and is only performed within the range of the targeting treatment area 21 so as to forming an expected workpiece surface.

The Second Embodiment

Figure 3:
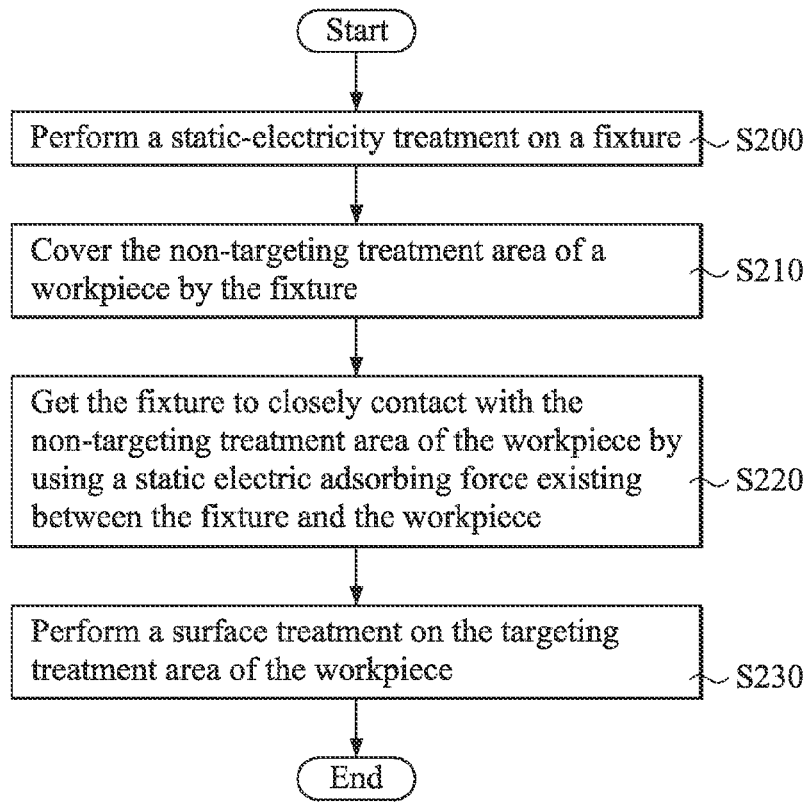
FIG. 3 is a flowchart illustrating the masking method for locally treating surface of the second embodiment according to the present invention.

Refer to FIG. 3. FIG. 3 is a flowchart illustrating the masking method for locally treating surface of the second embodiment according to the present invention. In this embodiment, the static electric adsorbing force is taken as an example. The masking method for locally treating surface comprises: Performing a static-electricity treatment on the fixture (step S200); Covering a fixture on the non-targeting treatment area of the workpiece (step S210); Getting the fixture to closely contact with the non-targeting treatment area of the workpiece by using an static electric adsorbing force existing between the fixture and the workpiece (step S220); and performing a surface treatment on the targeting treatment area of the workpiece (step S230).

Figure 4:
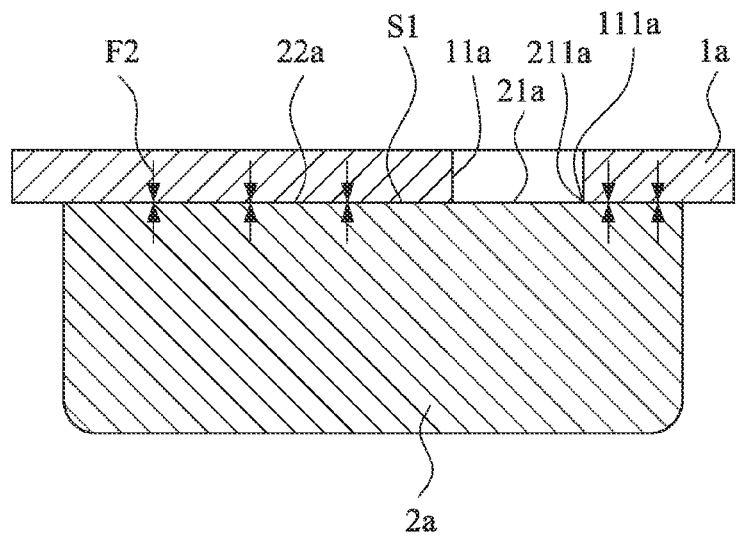
FIG. 4 is a cross-sectional view drawing illustrating the fixture and the workpiece of the second embodiment according to the present invention when the adsorbing force is applied.

Also Refer to FIG. 4. First, perform a static-electricity treatment on a fixture 1a (step S200). Next, cover the fixture 1a on the non-targeting treatment area 22a of the workpiece 2a (step S210). In this embodiment, the fixture 1a has an opening 11a. Both the shape of the opening 11a and the area of the opening 11a are the same of those of the targeting treatment 21a of the workpiece 2a. When the opening 11a are corresponding to the targeting treatment area 21a and the targeting treatment area 21a is exposed, the non-targeting treatment 22a of the workpiece 2a is covered by the fixture 1a.

A static electric absorbing force F2 between the fixture 1a and the workpiece 2a is generated when the fixture 1a performed with a static-electricity treatment contacts the workpiece 2a. So next, get the fixture 1a to closely contact with the non-targeting treatment area 22a of the workpiece 2a by using the static electric adsorbing force F2 existing between the fixture 1a and the workpiece 2a (step S220) at the contact surface S1, as shown in FIG. 4. And it is same as the fixture 1 in the first embodiment, the fixture 1a is made of a plastic material that is easy to be deformed after being forced. So the contact efficacy is obtained.

Next, perform a surface treatment on the targeting treatment area 21a of the workpiece 2a (step S230). In this embodiment, the surface treatment is an etching treatment. The surface treatment also can be an exposure treatment, an electroplating treatment, a laser carving treatment, or the like. Because when non-targeting treatment area 22a of the workpiece 2a and the fixture 1a closely contact with each other, the end edge 111a of the opening 11a of the fixture 1a corresponds to the edge 211a of the targeting treatment area 21a of the workpiece 2a. Therefore, the surface treatment are not performed within the range of the non-targeting treatment 22a of the workpiece 2a so as to form an expected workpiece surface.

The above description should be considered as only the discussion of the preferred embodiments of the present invention. However, a person skilled in the art may make various modifications to the present invention. Those modifications still fall within the spirit and scope defined by the appended claims.

What is claimed is:

1. A masking method for locally treating surface of a workpiece by masking the workpiece, wherein the workpiece has a targeting treatment area and a non-targeting treatment area, the masking method comprising steps of:

(a) performing a static-electricity treatment on the fixture;

(b) covering a fixture on the non-targeting treatment area of the workpiece to expose the targeting treatment area of the workpiece;

(c) getting the fixture to closely contact with the non-targeting treatment area of the workpiece by using an adsorbing force existing between the fixture and the workpiece to make an end edge of the fixture correspond to the edge of the targeting treatment area of the workpiece, wherein the adsorbing force is a static electric adsorbing force.

2. The masking method for locally treating surface as claimed in claim 1, wherein in the step (b), the fixture is made of a plastic material.

3. The masking method for locally treating surface as claimed in claim 1, wherein in the step (a), the workpiece is covered within the fixture by inserting the workpiece into the fixture, and a gap space is formed between the fixture and the workpiece.

4. The masking method for locally treating surface as claimed in claim 3, wherein the fixture includes a suction hole communicating with the gap space.

5. The masking method for locally treating surface as claimed in claim 1, further comprising, after step (c), a step of performing a surface treatment on the targeting treatment area of the workpiece.

6. The masking method for locally treating surface as claimed in claim 5, wherein the surface treatment is an exposure treatment, an etching treatment, an electroplating treatment, or a laser carving treatment.

\* \* \* \* \*